July 28, 1953          G. F. CHODZIESNER          2,646,904
WEIGHING DEVICE WITH ELECTRICAL VALVE CONTROL MEANS
Filed Aug. 8, 1947
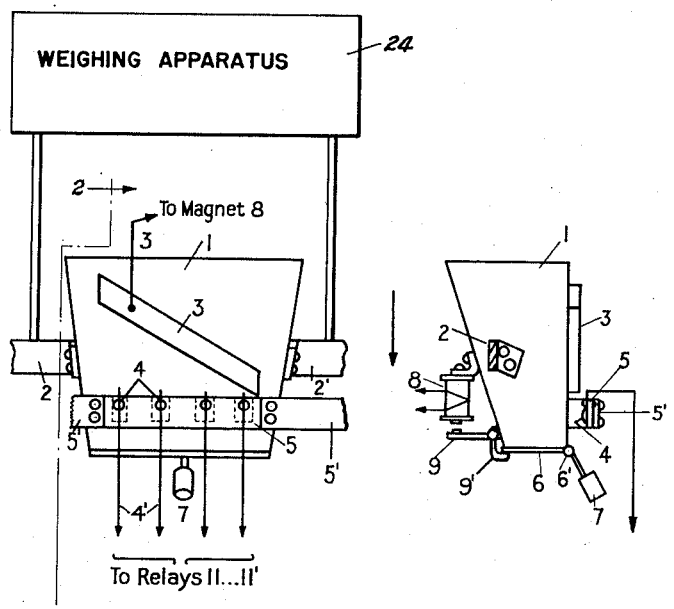
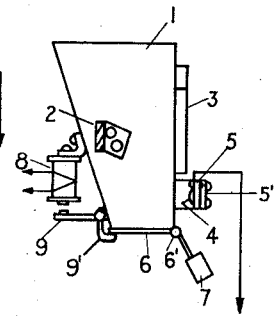
FIG.1          FIG.2
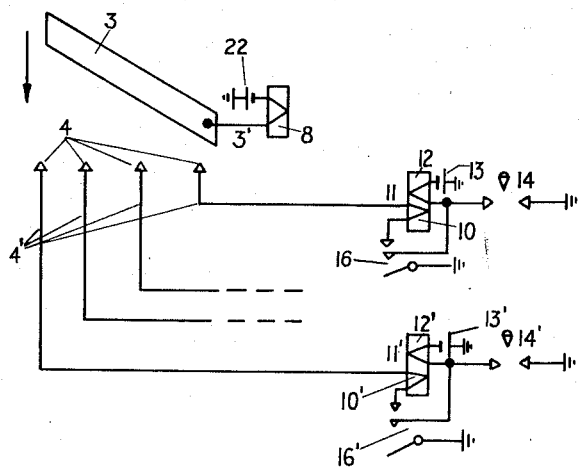
FIG.3
Inventor
Georg F. Chodziesner
By
Attorneys

UNITED STATES PATENT OFFICE 2,646,904

WEIGHING DEVICE WITH ELECTRICAL VALVE CONTROL MEANS

Georg F. Chodziesner, Bondi, near Sydney, New South Wales, Australia, assignor to Communication Engineering Pty. Limited, Cammeray, near Sydney, New South Wales, Australia, an incorporated company of Australia Application August 8, 1947, Serial No. 767,578
In Australia August 20, 1946

2 Claims. (Cl. 222—52)

The invention relates to weighing devices and more particularly to such devices where weighing operations shall be performed automatically when good are to be dispensed from stock distribution systems, vending machines and similar arrangements. The sale of goods from such arrangements has so far been made according to the quantity of these goods and this necessitates a pre-packing of loose articles or a grading of goods like fruit, vegetables and the like.

It is an object of the invention to adapt stock distribution systems, vending machines and the like to the sale of goods according to weight.

It is a further object of the invention to facilitate the sale of loose goods kept in bulk like flour, sugar and the like and to enable a quick selection and automatic weighing of these goods.

It is a feature of the invention to provide weighing devices which enable the operator to predetermine the quantity in weight of the goods to be sold by selecting electrical contact means which are operated by a movable receptacle under the influence of these goods.

It is a further feature of the invention to release automatically the wanted goods from the weighing device when the proper weight is reached.

Still a further feature of the invention is to combine the weighing device with a conveyor belt for automatic feeding of the goods to be weighed and sold.

These and other features of the invention will be apparent from the following detailed description taken in conjunction with the accompanying drawing, wherein:

Figure 1 is a view in front elevation of a weighing mechanism according to the invention; while Figure 2 is a view in side elevation thereof as taken at 2—2 of Fig. 1. Figure 3 is an electrical circuit diagram of the electrical circuits involved in the mechanism of Figs. 1 and 2.

Referring to Figs. 1 and 2, the weighing mechanism comprises a receptacle 1 for the goods to be weighed, this receptacle having secured to opposite sides thereof, bars 2, 2¹, suspended respectively from weighing apparatus 24.

Secured to one side of the receptacle 1, is an electrical contact bar 3, of metal or the like, which is mounted in an inclined position as shown. A series of fixed electrical contacts 4 are mounted in spaced relation, along a strip of insulating material 5, which in turn is mounted on a crossbar 5¹, the latter extending horizontally along the above-mentioned side of receptacle 1 and held in a fixed position by any suitable means.

The bottom of receptacle 1 is closed by a flap 6, hinged at 6' to receptacle 1, this flap being slightly overbalanced by a small counterweight 7, integral therewith, and such as to swing the flap 6 to the position shown and thus close the bottom of the receptacle 1, when the receptacle is empty. Mounted upon the receptacle 1 is an electromagnet 8, adapted when energized, to actuate an associated armature 9, having integral therewith a hook-shaped extension 9', adapted to engage the free end of the receptacle closure flap 6, as shown in Fig. 2, for locking the releasing this flap as explained hereinafter.

When goods are placed in the receptacle 1, the receptacle will be displaced downwardly against the counterbalancing action of the apparatus 24, whereby the contact bar 3 will make contact successively with the fixed contacts 4, starting from the right side in Fig. 1 and proceeding toward the left. Electrical connections 3', 4' extend from the contact bar 3 and the fixed contacts 4 respectively, for energizing the magnet 8 to release the goods, at a preselected load thereof, in the manner now to be described in connection with Fig. 3.

Referring to Fig. 3, four contacts 4 are shown, which for example, may correspond to load displacement weights of receptacle 1 of one-half, one, one and one-half and two pounds respectively, of the goods to be dispensed. Each contact 4 is connected over its associated conductor 4' to a winding 10, 10', etc. of a two-winding differential relay 11, 11', etc., the remaining winding 12, 12' etc. of each such relay being connected from battery 13, 13' etc. through normally open push-button contacts 14, 14' etc. to ground as shown. The contact bar 3 is in turn connected over lead 3' through the winding of electromagnet 8 to battery 22. Momentary operation of any of the push-buttons 14, 14' etc. will energize the associated differential relay 11, 11' etc. over its winding 12, 12' and the push-button circuit above traced, whereupon the relay will immediately lock to ground through its contacts 16, 16', etc., contacts 16, 16', etc. also serving to connect ground through relay winding 10, 10', etc., to the corresponding contact 4.

In the operation of the mechanism assume, for example, that it is desired to dispense one-half pound of some bulk goods, such as lima beans, peas, etc. To accomplish this the push-button 14, corresponding to the one-half pound contact 4, is momentarily actuated to energize and lock up relay 11. The bulk goods are thereupon charged into the receptacle 1 in a manner hereinafter explained. As the charging continues, the receptacle 1 will be displaced downwardly against the counterbalancing action of the apparatus 24 until the contact bar 3 engages the right hand contact 4, whereupon a circuit will be completed to actuate the electromagnet 8, this circuit being traced from battery 22 through the winding of the electromagnet, thence through the right hand contact 4 and over its associated lead 4' through the differential winding 10 of relay 11 to ground at 16. Electromagnet 8 thus operates its armature 9 to release flap 6, which thus swings downwardly under the weight of the goods against the counterbalancing action of the counterweight 7, to dispense the goods into any suitable receptacle, such as a paper bag or the like. The energizing circuit above traced for actuating electromagnet 8, also releases the differential relay 11, since the magnetic flux set up by the current in winding 10 opposes that of winding 11, thus restoring the relay circuit to normal. Meantime and as soon as the bulk goods have been dispensed, flap 6 swings back to its normal position under the counterbalancing action of the counterweight 7, whereby the flap 6 returns to locking engagement with the hook-shaped member 9', inasmuch as the aforesaid release of relay 11 also opens at its contacts 16 the energizing circuit for electromagnet 8 whereby the electromagnet also releases.

The goods are normally fed at a comparatively slow rate so that individual articles are dropped one after the other into the weighing receptacle at such a speed that when the proper weight is reached, the articles are discharged from the weighing receptacle and the flap at the bottom of this weighing receptacle closed again before a further article falls into the weighing receptacle.

The weighing device described above can be used in automatic stock distribution systems and the goods to be weighed can be fed into the receptacle by conveyor belts or the like as mentioned above. The goods dispensed from the receptacle can fall on to a conveyor belt and be sent to a collecting place or they can be filled in bags or the like to be sold directly.

The weighing device is useful where a selection of loose goods has to be made in quick succession. These goods, for example, flour, sugar, rice, salt and so on are stored in big containers which have outlets ending over the receptacle of the weighing device. These outlets can be automatically opened and closed by pressing a button corresponding to the selected goods.

The foregoing describes the invention by way of example only and alterations can be made to suit the requirements without departing from the scope of the invention.

I claim:

1. A weighing mechanism for automatically dispensing goods according to a preselected weight thereof, comprising: a weighing receptacle provided at the base with a pivotally mounted and counter-weighted flap closure member; electromagnetic means including a locking lug normally engaging said closure member to lock the same in closed position, but energisable to release said closure member; means displaceably mounting said receptacle for displacement in accordance with the weight of goods deposited therein; and means for energising said electromagnetic means for discharging said goods at a preselected weight thereof, said means comprising a series of stationarily mounted electrical contacts, contact means carried by said receptacle in such position with respect to the stationary contacts as to successively engage said stationary contacts with displacement of said receptacle, electrical connections from said contact means to said electromagnetic means, a plurality of selectively actuable contact keys, each key corresponding to one of said stationary contacts, switching means associated with each of said keys and electrically connected therewith for operation thereby to energise said electromagnetic means upon engagement of said receptacle contact means with the selected stationary contact, and means to lock any of said switching means by operation of a corresponding contact key and to unlock said switching means upon operation of said electromagnetic means.

2. A weighing mechanism for automatically dispensing goods according to a preselected weight thereof, comprising: a weighing receptacle provided at the base with a pivotally mounted and counter-weighted flap closure member; electromagnetic means including a locking lug normally engaging said closure member to lock the same in closed position, but energisable to release said closure member; means displaceably mounting said receptacle for displacement in accordance with the weight of goods deposited therein; and means for energising said electromagnetic means for discharging said goods at a preselected weight thereof, said means comprising a series of stationarily mounted electrical contacts, a contact bar carried by said receptacle in such position with respect to the stationary contacts as to successively engage said stationary contacts with displacement of said receptacle, electrical connections from said contact means to said electromagnetic means, a plurality of selectively actuable non-locking contact keys, each key corresponding to one of said stationary contacts, a differential relay having two windings and relay contact means associated with each of said contact keys, electrical connections between one winding of said relay, a corresponding contact key and said relay contact means for operating said relay and subsequent locking thereof, and further electrical connections between the other of said windings, said relay contact means and a corresponding stationarily mounted electrical contact to energise said other winding and said electromagnetic means upon engagement of said contact bar with said corresponding stationary contact, and to release said differential relay.

GEORG F. CHODZIESNER.

References Cited in the file of this patent

UNITED STATES PATENTS

| Number | Name | Date |
|---|---|---|
| 741,975 | Newman | Oct. 20, 1903 |
| 1,083,959 | Vogelsong | Jan. 13, 1914 |
| 1,994,797 | Thomas | Mar. 19, 1935 |
| 2,071,443 | Weckerly | Feb. 23, 1937 |
| 2,132,237 | Haegle | Oct. 4, 1938 |
| 2,348,372 | Weckerly | May 9, 1944 |
| 2,367,247 | Valerino | Jan. 16, 1945 |